June 15, 1965    T. BARABUTES ETAL    3,189,815
HALL-EFFECT DEVICE UTILIZING TRANSFORMER PHASE CONTROL MEANS
Filed June 27, 1961

WITNESSES
Leon J. Lasa
James F. Young

INVENTORS
Bernard E. Lenehan and
Theodore Barabutes
BY C. L. Freedman
ATTORNEY

United States Patent Office 3,189,815
Patented June 15, 1965

3,189,815
HALL-EFFECT DEVICE UTILIZING TRANS-
FORMER PHASE CONTROL MEANS
Theodore Barabutes, Morristown, and Bernard E.
Lenehan, Bloomfield, N.J., assignors to Westinghouse Electric Corporation, East Pittsburgh, Pa.,
a corporation of Pennsylvania
Filed June 27, 1961, Ser. No. 120,069
4 Claims. (Cl. 323—120)

This invention relates to compensation for phase displacement errors between alternating quantities and it has particular relation to such compensation as employed in Hall-effect devices for measuring a function of two alternating quantities.

Although it may be employed in transformers utilized for various purposes, the invention is particularly suitable for Hall-effect devices. For this reason, the invention will be described as incorporated in a Hall-effect device designed to respond to the power flowing in an alternating-current circuit.

Hall-effect devices are well known in the art. One example of such a device will be found in Paper No. CP 59–875 entitled "Principles and Considerations in the Design of a Hall Multiplier" by T. Barabutes and W. J. Schmidt. This paper was printed in 1959 by the American Institute of Electrical Engineers, 33 West 39th Street, New York City. In a device of the type described in this paper, a Hall plate is subjected to a magnetic flux and a control current which are derived from two alternating quantities. For optimum accuracy, a correct phase relationship should be maintained between the magnetic flux and the control current. This phase relationship is affected by various factors such as winding resistance and iron losses in the Hall-effect device. An error of 1/3 of a degree in the phase relationship represents an error of the order of 1% at 50% power factor when the Hall-effect device is employed as a wattmeter in the manner set forth in the aforesaid paper.

In accordance with the invention, compensation is provided for phase-relation errors. In a transformer, such compensation preferably is provided by the proportioning of the leakage reactance of the transformer. In a preferred embodiment of the invention, a voltage transformer employed in a Hall-effect device of the type described in the aforesaid paper has its leakage reactance proportioned to establish correct phase relations between the magnetic flux and the control current of the Hall-effect device.

It is, therefore, an object of the invention to provide improved compensation for phase-relation errors.

It is another object of the invention to provide a transformer having modified leakage reactance for the purpose of establishing desired phase relations.

It is also an object of the invention to provide an accurate Hall-effect device responsive to a function of two alternating quantities.

Other objects of the invention will be apparent from the following description taken in conjunction with the accompanying drawing, in which.

Figure 1:
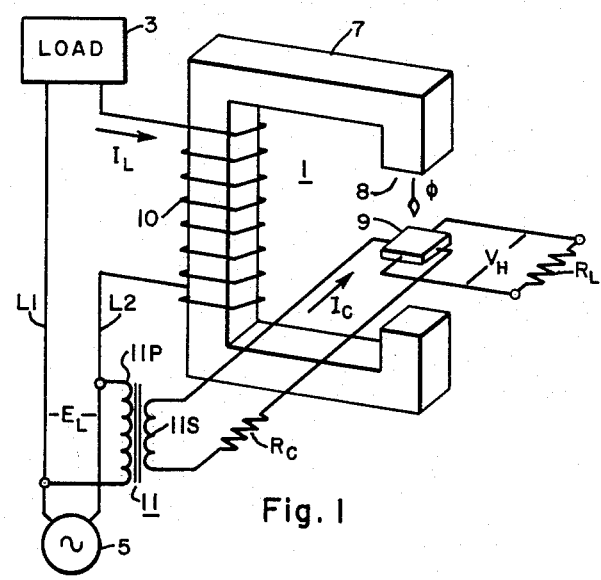
FIGURE 1 is a schematic view with parts shown in perspective of a system employing a Hall-effect device.

Referring to the drawing, FIG. 1 shows a Hall-effect device 1 which is responsive to power flowing in a circuit represented by conductors L1 and L2. These conductors are utilized for energizing a load 3 from a source of alternating current 5. Although the frequency of the source 5 may be selected from a wide range of frequencies, it will be assumed for the present purposes that the source 5 is a single-phase alternating-current source operating at a power frequency of 60 cycles per second.

The Hall-effect device 1 includes a C-shaped magnetic structure 7 having an air gap 8 within which a Hall plate 9 is located. A winding 10 surrounds a portion of the magnetic structure 7. When suitably energized from an alternating source, the winding 10 directs an alternating magnetic flux $\phi$ through the air gap 8 and the Hall plate 9. As employed in FIG. 1 arrows represent instantaneous directions of flow. By inspection of FIG. 1, it will be noted that the winding 10 is connected in the conductor L2 for energization by the line current $I_L$.

For supplying a control current $I_c$ to the Hall plate 9, a transformer 11 has a primary winding 11P connected across the conductors L1 and L2. A secondary winding 11S of the transformer is connected through a resistor $R_c$ to direct a control current $I_c$ across the Hall plate 9.

The output voltage $V_H$ of the Hall plate is connected across a load impedance $R_L$. For present purposes, it will be assumed that the load impedance $R_L$ represents the moving coil of a permanent magnet moving-coil instrument similar to that shown in the aforesaid paper by Barabutes and Schmidt. The instrument indicates the power flowing in the circuit represented by the conductors L1 and L2.

The accuracy of a Hall-effect device 1 depends in part on the maintenance of proper phase relations between the magnetic flux $\phi$ and the control current $I_c$. Because of factors such as the resistance of the winding 10 and the losses of the magnetic structure 7, the magnetic flux lags the current $I_L$ by a small angle. For a similar reason, the control current $I_c$ is slightly displaced in phase from the line voltage $E_L$ which is applied to the primary winding 11P. Assuming that the transformer load is a resistive load, the control current $I_c$ slightly leads the voltage $E_L$ for conventional small-voltage transformers.

In order to provide optimum accuracy for the Hall-effect device, the phase-angle shifts of the magnetic flux $\phi$ relative to the line current $I_L$ and of the control current $I_c$ relative to the line voltage $E_L$ are made equal and in the same direction. In a preferred embodiment of the invention, suitable compensation for the phase relations is incorporated in the voltage transformer 11.

Figure 2:
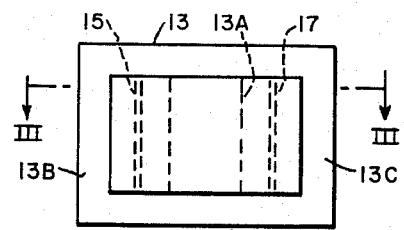
FIG. 2 is a view in elevation of a potential or voltage transformer suitable for the device of FIG. 1.
Figure 3:
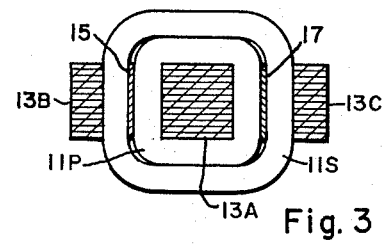
FIG. 3 is a view in section taken along the line III—III of FIG. 2.

As shown in FIGS. 2 and 3, a suitable voltage transformer includes a conventional laminated soft magnetic structure 13 having an inner leg 13A and two outer legs 13B and 13C. These legs are side-by-side in the same plane and are parallel to each other. The windings of the transformer are concentrically mounted on the inner leg 13A. Thus, the primary winding 11P surrounds the inner leg 13A and the secondary winding 11S surrounds the primary winding 11P. As thus far specifically described, the voltage transformer 11 is of conventional design and may be constructed in any conventional manner.

In order to correct the phase relations of the Hall-effect device, the leakage reactance of the voltage transformer is increased. In a preferred embodiment of the invention, the increase is obtained by locating ribbons of soft magnetic material between the primary and secondary windings. It will be noted that one ribbon 15 is positioned between the inner leg 13A and the outer leg 13B whereas a second ribbon 17 is located between the inner leg 13A and the outer leg 13C. These ribbons are insulated from the windings and extend substantially for the full lengths of the windings. By inspection of FIGS. 2 and 3, it will be noted that the ribbons lie substantially within the main core of the transformer. It is conventional practice to construct the main core of laminations of silicon iron. Portions of such a lamination may be employed as ribbons 15 and 17.

In order to explain the operation of the invention, reference will be made now to FIG. 4 which shows the equivalent circuit of a transformer. For simplicity, it will be assumed that the transformer has a 1 to 1 transformer ratio. A line voltage supplies a primary current $I_P$ which passes through the primary leakage reactance $X_1$ and the primary resistance $R_1$. The exciting current $I_e$ flows through a shunt path represented by the resistor $R_e$ and $X_m$ in parallel. The resistance $R_e$ represents the iron losses and with the reactance $X_m$ provides a path for the no-load or exciting current of the transformer. The secondary current $I_c$ flows through the leakage reactance $X_2$ of the secondary winding, the resistance $R_2$ of the secondary winding and the load resistor $R_T$ which represents the total load across the output terminals of the transformer.

Figure 4:
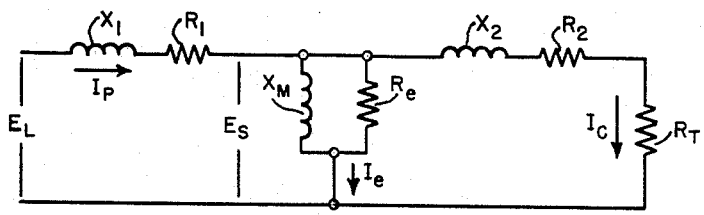
FIG. 4 is a schematic view showing an equipment circuit for the transformer of FIG. 2; and, FIGS. 5 and 6 are vector diagrams which are useful in explaining the performance of the transformer of FIG. 2.
Figure 5:
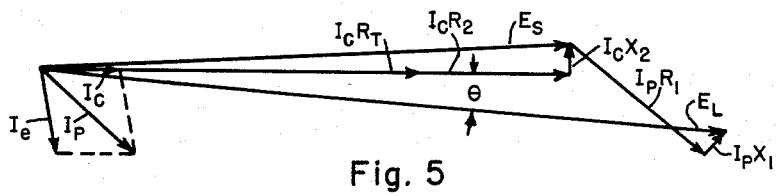

Assuming that the ribbons 15 and 17 are not employed, the vector diagram for the equivalent circuit of FIG. 4 may be as shown in FIG. 5. It will be noted that the current $I_c$ which flows through the load $R_T$ leads the voltage $E_L$ of the line by a small angle $\theta$.

Figure 6:
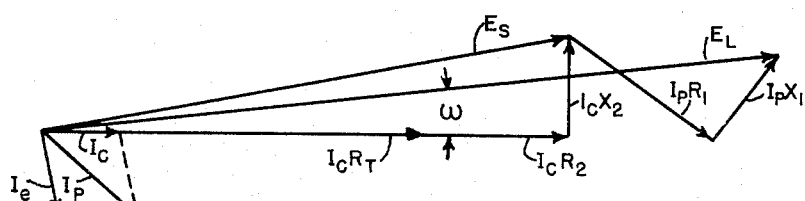

The insertion of the ribbons 15 and 17 substantially increases the leakage reactances $X_1$ and $X_2$. Consequently, the voltage drops $I_P X_1$ and $I_c X_2$ across these leakage reactances are materially increased. Because of these increases, the vector diagram for the transformer which includes the ribbons 15 and 17 takes the form shown in FIG. 6. It will be noted that the current $I_c$ flowing through the load resistor $R_T$ now lags the line voltage $E_L$ by a small angle $\omega$. By proper proportioning of the ribbons 15 and 17, this angle may be equal to the angle by which the magnetic flux $\phi$ lags the line current $I_L$.

It should be noted that the phase compensation here provided does not require external components. Thus, a compact assembly is assured at low cost. Furthermore, the compensation is virtually immune to vibration or shock.

Although the invention has been described with reference to certain specific embodiments thereof, numerous modifications falling within the spirit and scope of the invention are possible.

We claim as our invention:

1. In a device responsive to an alternating quantity, a Hall-device including a magnetic structure having an air gap, a Hall plate disposed in the air gap, said magnetic structure providing a path for magnetic flux passing through the air gap and the Hall plate disposed in the air gap, winding means associated with the magnetic structure to link said path and effective when energized by alternating current for directing alternating magnetic flux through the magnetic structure and the Hall plate, a transformer having a secondary winding connected to direct a control current through the Hall plate which is incorrectly displaced in phase from the alternating flux when alternating current is applied to the winding means and when an alternating input is applied to the primary winding of the transformer, and phase-controlling means cooperating with the transformer to eliminate said incorrect displacement in phase.

2. In a device responsive to an alternating quantity, a Hall-device including a magnetic structure having an air gap, a Hall plate disposed in the air gap, said magnetic structure providing a path for magnetic flux passing through the air gap and the Hall plate disposed in the air gap, winding means associated with the magnetic structure to link said path and effective when energized by alternating current for directing alternating magnetic flux through the magnetic structure and the Hall plate which lags the alternating current, a transformer having a secondary winding connected to direct a control current through the Hall plate which is incorrectly displaced in phase from the alternating flux when alternating current is applied to the winding means and when an alternating input is applied to the primary winding of the transformer, and phase-controlling means cooperating with the transformer to eliminate said incorrect displacement in phase, said phase-controlling means comprising means for increasing the leakage reactance of the transformer.

3. In a device responsive to an alternating quantity, a Hall-device including a magnetic structure having an air gap, a Hall plate disposed in the air gap, said magnetic structure providing a path for magnetic flux passing through the air gap and the Hall plate disposed in the air gap, winding means associated with the magnetic structure to link said path and effective when energized by alternating current for directing alternating magnetic flux through the magnetic structure and the Hall plate which lags the alternating current, a transformer having a secondary winding connected to direct a control current through the Hall plate which is incorrectly displaced in phase from the alternating flux when the alternating current is applied to the winding means and when an alternating input is applied to the primary winding of the transformer, said transformer primary and secondary windings being concentric, and a soft magnetic member located between said primary and secondary windings to increase the leakage reactance thereof to reduce said incorrect displacement in phase.

4. In a device responsive to an alternating quantity, a Hall-device including a magnetic structure having an air gap, a Hall plate disposed in the air gap, said magnetic structure providing a path for magnetic flux passing through the air gap and the Hall plate disposed in the air gap, winding means associated with the magnetic structure to link said path and effective when energized by alternating current for directing alternating magnetic flux through the magnetic structure and the Hall plate which lags the alternating current, a voltage transformer having a secondary winding connected to direct a control current through the Hall plate which is incorrectly displaced in phase from the alternating flux when the alternating current is applied to the winding means and when an alternating input is applied to the primary winding of the transformer, said transformer having a soft magnetic structure providing an inner and two outer spaced parallel legs disposed in a common plane, said primary and secondary windings being concentric and surrounding the inner leg, and a separate soft magnetic member located between the inner leg and each of the outer legs, said magnetic members being located between the primary and secondary windings to increase the leakage reactance thereof sufficiently to eliminate said incorrect displacement in phase.

References Cited by the Examiner

UNITED STATES PATENTS

| | | | |
|---|---|---|---|
| 2,276,032 | 3/42 | Gibbs | 336—160 |
| 2,599,182 | 6/52 | Kerns | 336—182 |
| 2,616,074 | 10/52 | McCreary | 323—94 |
| 2,706,280 | 4/55 | Guzzo et al. | 336—182 |
| 2,852,732 | 9/58 | Weiss | 323—94 |
| 2,994,037 | 7/61 | Boyle et al. | 324—45 |
| 3,054,952 | 9/62 | Lehrmann | 324—45 |

LLOYD McCOLLUM, *Primary Examiner.*

MILTON O. HIRSHFIELD, *Examiner.*